Figure 1:
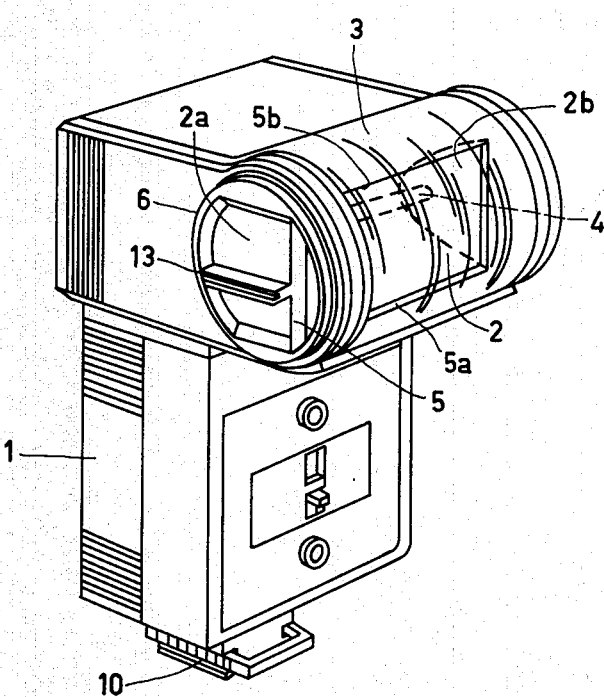

United States Patent [19]

Alkema et al.

[11] 4,333,127

[45] Jun. 1, 1982

[54] ELECTRONIC FLASHGUN

[75] Inventors: Frederik H. Alkema; Meerten Luursema, both of Eindhoven, Netherlands

[73] Assignee: U.S. Philips Corporation, New York, N.Y.

[21] Appl. No.: 189,438

[22] Filed: Sep. 22, 1980

[30] Foreign Application Priority Data

Oct. 18, 1979 [NL] Netherlands ......................... 7907685

[51] Int. Cl.³ ............................................. G03B 15/02
[52] U.S. Cl. ..................................... 362/17; 362/18; 362/217; 362/223; 362/282; 362/293; 362/301; 362/346

[58] Field of Search ................... 362/17, 346, 18, 217, 362/223, 282, 293, 301

[56] References Cited

U.S. PATENT DOCUMENTS 4,175,279 11/1979 Asaki ...................................... 362/18
4,194,234 3/1980 Geissler ................................. 362/17

Primary Examiner—Stephen J. Lechert, Jr.
Attorney, Agent, or Firm—Robert S. Smith

[57] ABSTRACT

Electronic flashgun having a rotatable reflector accommodating a discharge lamp, the reflector having means to move filters in front of the flash discharge lamp. The filters are inserted via an elongate coverable aperture (5) in an end partition (2a).

6 Claims, 4 Drawing Figures

ELECTRONIC FLASHGUN

The invention relates to an electronic flashgun having a case which accommodates an elongate reflector which is rotatable about a longitudinal axis and is arranged between end partitions which extend substantially transversely to said axis. A flash discharge tube is accomodated in the reflector.

Such an electronic flashgun is disclosed in German Auslegeschrift No. 2,446,024. The known electronic flashgun can be used both for direct flashing and for bounce-flashing by rotation of the reflector around its axis. In the direct method, the scene to be photographed is directly illuminated by the light coming from the flash tube while for bounce flashing the light arrives at the scene to be photographed after reflection from a relatively remote plane, for example a ceiling.

In order to improve the quality of photographs or slides taken with the aid of a flashgun, it is known to move one or more effect filters, such as color filters or attenuation or correction filters, to a position in front of the light exit aperture of the flashgun. It is known (see, for example, U.S. Pat. No. 4,109,301) to use a special adaptor for accommodating these filters, with the adaptor attached to the front of the case, near the light exit aperture of the flashgun. Such a known adaptor is secured in a fixed position with respect to the case of the electronic flashgun.

In a device according to the above German Auslege-Schriff, special provisions are required to attach such an adaptor to the wall of the case, which is a drawback. A further drawback is that bounce-flashing using filters with an electronic flashgun of the type mentioned in the opening paragraph is troublesome, owing to the fixed position of adaptor with respect to the case.

The invention has for its object to provide an electronic flashgun of the type mentioned in the opening paragraph, it being possible to accommodate filters in a simple way.

According to the invention, an electronic flashgun is defined in the opening paragraph, is characterized in that one of the end partitions is provided with a slot through which an effect filter can be guided into position immediately in front of the reflector and flash tube.

In an electronic flashgun according to the invention, a filter assumes a fixed position with respect to the reflector. When the reflector is rotated to a position for bounce flashing, the filter remains in position in front of the reflector. A suitable means by means of which the filters can be arranged in front of the flash discharge tube, is for example, a groove in the reflector wall or guide channels adjacent the parallel edges of the reflector wall. The slot through which filters (for example color filters) can be positioned from the outside is located in an end partition which may, for example, have a handle, which is accessible from the outside, for rotating the reflector around its axis. When no filter is in position in front of the reflector opening, this slot in the end partition can be closed (for example by means of a slide or a plate), in order to prevent the reflector surface from being contaminated by dust particles and the like.

An electronic flashgun according to the invention does not require additional auxiliary means, such as adaptors, for the application of filters. The case of the flashgun therefore does not require additional provisions for the connection of those auxiliary means.

In an embodiment of an electronic flashgun according to the invention the reflector is arranged in a transparent hollow cylinder which is rotatable about its longitudinal axis and whose wall surface is provided with a plurality of zones extending in the longitudinal direction over the full length and having mutually different refraction profiles.

The transparent cylinder has, for example, three zones which extend in parallel with the longitudinal axis, and which are provided with mutually different refraction profiles. The different refraction profiles can be moved at the user's option, both for direct and for bounce flashing, in front of the reflector opening, depending on whether a telescopic lens, a wide-angle lens or a standard objective lens, respectively, is used on the camera. The transparent cylinder comprises, for example, a closed end which is coupled to a said end partition of the reflector by means of a snap mechanism, so that a refraction profile keeps in its adjusted position with respect to the light exit aperture of the reflector, even when the reflector is rotated.

In an embodiment of an electronic flashgun according to the invention, the flashgun is provided with a screen which can be arranged at an oblique angle to, and extending from, the flashgun case with a major surface facing the flashtube with the reflector in the bounce flash position, at least a portion of the surface having a reflecting mirror surface.

When the user wants to use the flashgun with the bounce flash method, he rotates the reflector to such a position that a portion of the light coming from the flash lamp is incident on the screen. The screen is then at such an angle that the light reaching it is directly reflected by the mirror surface towards the scene to be photographed. In this manner, particularly when the intensity of the transmitted flash light is affected by a filter, bounce flashing now furnishes a satisfactory illumination of the front part of the object to be photographed. The remaining portion of the light emitted by the flash tube is reflected from, for example, a ceiling.

Preferably, the screen is hinged on the case wall. The screen can then be operated in a simple manner by the user.

In a further embodiment of an electronic flashgun according to the invention the reflective mirror surface is formed by the elongate strip on a screen which has a diffusely reflecting surface, the screen being detachable from the case.

For bounce-flashing such a screen is preferably used in situations in which the ceiling hardly contributes to a diffused dispersion of the light, for example because the ceiling surface contains material which is not so suitable for diffuse dispersion, for example wood, or because the ceiling is at too great a distance from the flash unit. When there is, on the diffusely reflecting surface, a strip which reflects almost all the light incident thereon directly to the object to be photographed, a satisfactory illumination of the front part of the object to be photographed is obtained, in addition to the known advantage resulting from bounce flashing.

The elongate reflective strip may be fastened to the surface of the screen, for example, extending in a direction perpendicular to the longitudinal axis of the reflector. Alternatively, the strip may be detachable from the screen.

The reflective strip is preferably adjustable in the direction of the longitudinal axis of the reflector.

The screen may be connected to the case wall and can then be hinged outwards or pulled out by the user. The screen may, however, alternatively be marketed as a separate component part. Then the case of the flashgun comprises means to accommodate the screen. Suitable means are, for example, guide slots.

The invention will now be further explained by way of non-limitative example with reference to the accompanying drawings.

Figure 2:
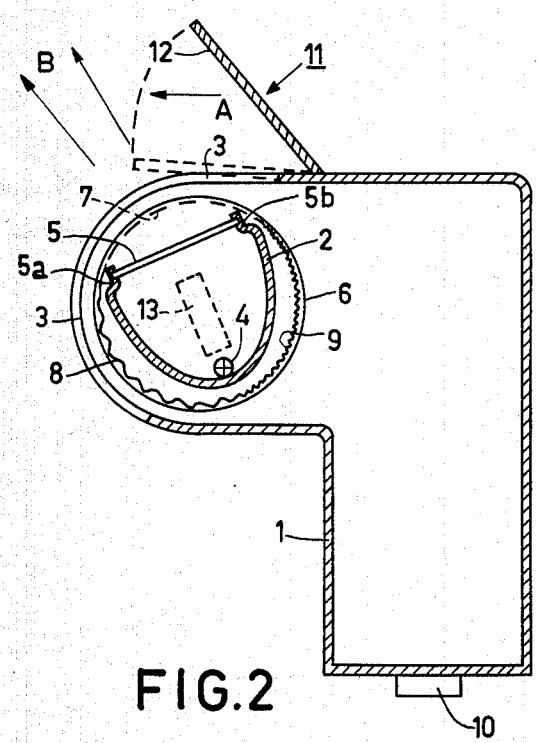
Figure 3:
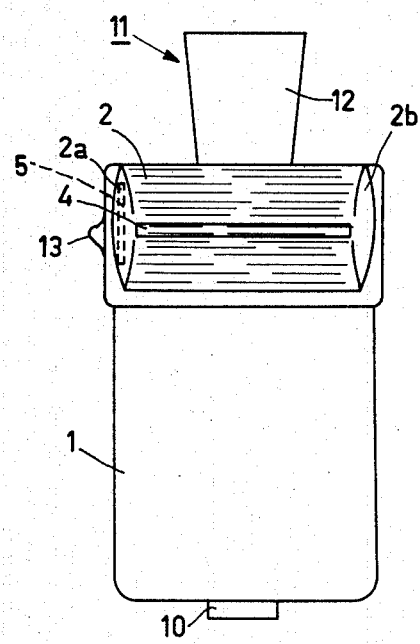
Figure 4:
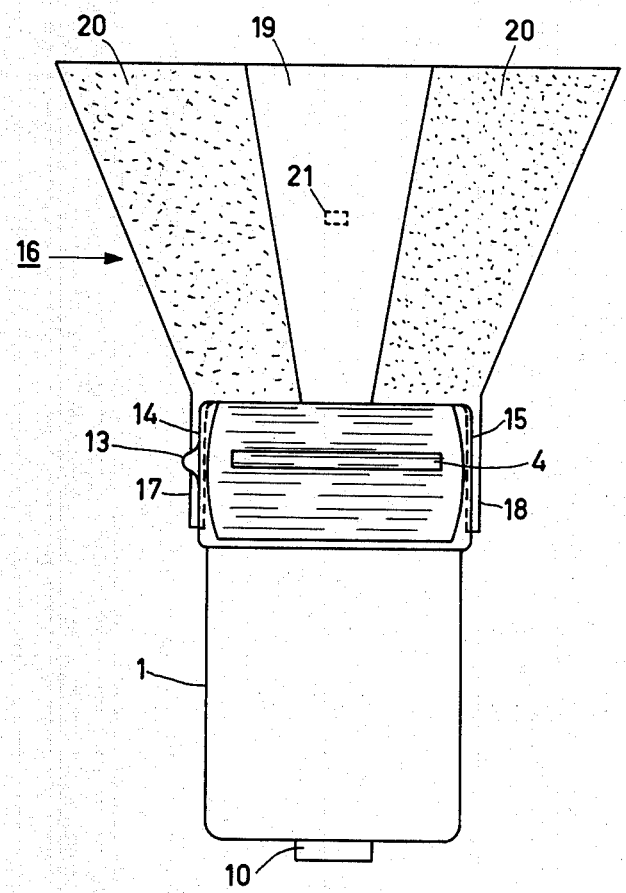

In the drawings,

FIG. 1 is a perspective view of an embodiment of an electronic flashgun according to the invention, FIG. 2 shows a longitudinal cross-section of a further embodiment of an electronic flashgun according to the invention, FIG. 3 is an elevational view of an electronic flashgun shown in FIG. 2 and FIG. 4 is an elevational view of an embodiment of an electronic flashgun according to the invention having a detachable, diffusely reflecting, screen with a reflective strip.

In FIG. 1 reference numeral 1 denotes the case of the electronic flashgun. This case consists of a synthetic material, for example polycarbonate. The case is provided with an elongate parabolic reflector 2, which is rotatable about its longitudinal axis. The reflector is arranged between two end partitions 2a and 2b (see also FIG. 3). In the region 3 of the reflector the case wall is transparent. A tubular flash discharge lamp 4 is accommodated in the reflector.

The end partition 2a (see also FIG. 3) is provided with an elongate opening 5 through which effect filters, such as color filters, can be inserted from the outside in front of the discharge lamp. This opening 5 can be closed by means of a slide or plate, being present behind partition 2a. The reflector assembly is provided with guides 5a and 5b to guide and hold a filter (see also FIG. 2). A transparent cylinder 6, is rotatable about its longitudinal axis and has an inner surface which is provided with three zones which extend in the longitudinal direction and have differing refraction profiles 7, 8 and 9 the cylinder 6 is provided around the reflector 2. These zones can optionally be moved in front of the light exit aperture of the reflector. They serve as an auxiliary means when the camera connected to the flashgun is fitted with a standard objective lens (profile 7), a wide-angle objective lens (profile 8) and tele-objective lens (profile 9). See FIG. 2. The hollow transparent cylinder 6 can be adjusted in these positions by means of a rim (not shown) on the outside of partition 2b (see FIG. 1). The zones extend the full length of the cylinder 6. The transparent cylinder also has a detent or snap connection (not shown), so that each zone keeps in a predetermined position with respect to the reflector during rotation of the reflector. The case 1 also has a connecting element 10 for connection to a camera.

The reference numerals in FIGS. 2, 3 and 4 denote the same components as in FIG. 1. In FIG. 2, the case 1 carries a screen 11 which is hingeable to a fixed angle of approximately 45° with respect to a horizontal plane at the top of the case as viewed in FIGS. 1 and 2. The screen 11 is movable to a horizontal plane. The screen surface facing the flash discharge lamp 4 and reflector 2 is provided with a mirror 12 comprising an aluminium layer. The end partition 2a, with aperture 5 through which a filter can be inserted, has a handle 13 (see also FIG. 1) by means of which the reflector can be rotated to a position for bounce-flashing. The reflector 2 is rotatable to such a position that, when screen 11 is hinged outwards of the case at an angle of approximately 45° to the horizontal plane, as shown, a portion of the flash light is incident on the mirror 12, causing a portion of the light to be reflected to the front part of the object to be photographed (arrow A). The remaining portion of the light is not incident on the reflective screen surface and continues its path (arrows B) to a ceiling from which it is diffusely reflected.

FIG. 3 is an elevational view of the screen in the hinged-out position. The screen 11 extends over approximately one third of the length of the flash discharge lamp.

In the embodiment of an electronic flash shown in FIG. 4 the case 1 has slots 14 and 15 to accommodate a detachable synthetic screen 16. The screen is provided with arms 17 and 18 which are received by the slots and has a diffusely reflecting surface 20 (for example of roughened aluminium) facing the flash discharge lamp 4.

The central region of the screen is provided with an elongate mirror strip (aluminium) 19 which covers approximately one third of the screen surface. The position of the reflective strip 19 is adjustable with respect to the longitudinal axis of the flash-lamp 4 by means of a knob 21. If so desired, the user can completely remove the reflective strip 19 from the screen by means of the knob 21. The screen surface then contains only diffusely reflecting material.

What is claimed is:

1. An electronic flashgun which comprises: a case having an elongate generally concave reflector mounted for rotation about a longitudinal axis, end partitions disposed at the axial extremities of said reflector which extend substantially transverse to said axis, a flash discharge lamp disposed in said reflector, characterized in that one of said end partitions is provided with a slot disposed for mounting an effect filter immediately in front of said reflector and said flash tube.

2. An electronic flashgun as claimed in claim 1, characterized in that the reflector is located in a transparent hollow cylinder which is rotatable about its longitudinal axis and whose wall surface is provided with a plurality of zones extending in the longitudinal direction over substantially the full axial extent thereof, each zone and having different refraction characteristics.

3. An electronic flashgun as claimed in claim 1 or 2, further including a screen which can be arranged at an oblique angle to, and extending from, the flashgun case with a major surface facing the flash tube with said reflector in a bounce flash position, at least a portion of said surface having a reflective mirror surface.

4. An electronic flashgun as claimed in claim 3, characterized in that the screen is mounted by hinges on said case.

5. An electronic flashgun as claimed in claim 3, characterized in that the reflective mirror surface is provided in the form of an elongate reflective strip on a screen having a diffusely reflecting surface, the screen being detachable from the case.

6. An electronic flashgun as claimed in claim 5, characterized in that the position of the reflective strip on the screen is adjustable in the direction of the longitudinal axis of the reflector.

* * * * *